S. G. WARNER.
CLUTCH LEVER STOP FOR MOTOR VEHICLES.
APPLICATION FILED APR. 11, 1919.
1,344,602.
Patented June 22, 1920.
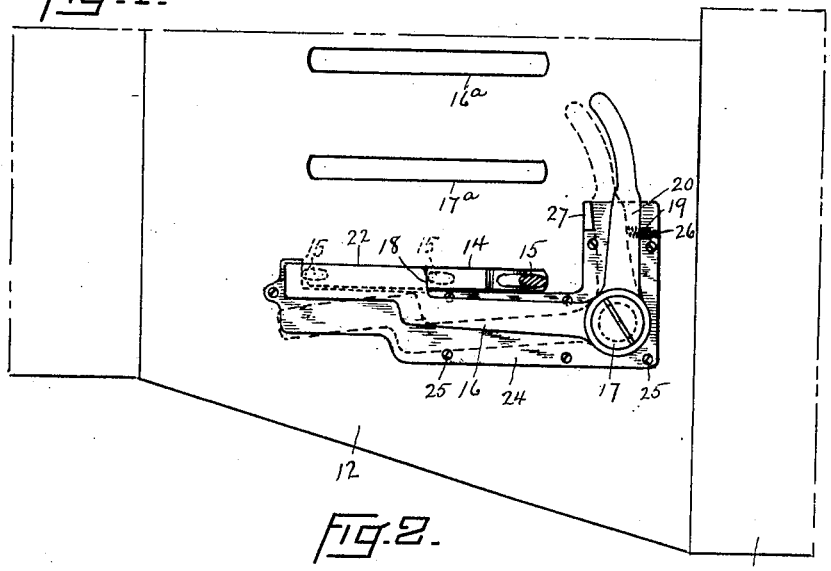
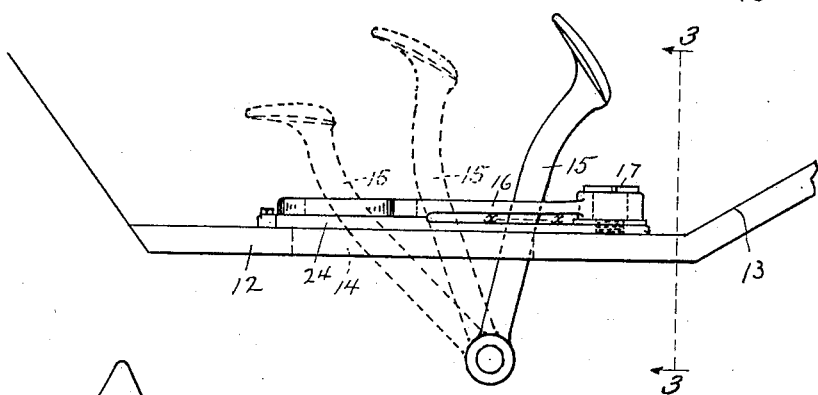
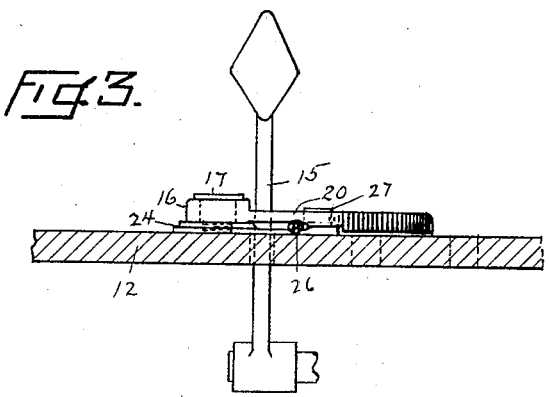
INVENTOR.
Stewart G. Warner
by Knight Brown Quimby Mays
ATTYS.

UNITED STATES PATENT OFFICE.

STEWART G. WARNER, OF LYNN, MASSACHUSETTS.

CLUTCH-LEVER STOP FOR MOTOR-VEHICLES.

1,344,602.  Specification of Letters Patent.  Patented June 22, 1920.

Application filed April 11, 1919. Serial No. 289,251.

*To all whom it may concern:*

Be it known that I, STEWART G. WARNER, a citizen of the United States, residing at Lynn, in the county of Essex and State of Massachusetts, have invented new and useful Improvements in Clutch-Lever Stops for Motor-Vehicles, of which the following is a specification.

This invention is related to the foot-operated clutch lever employed in motor vehicles such as the Ford automobile, to adjust the speed-governing clutch. Said clutch is normally adjusted for high speed, and when this adjustment prevails, the clutch lever is at one extreme of its oscillating movement and in high speed position. When the lever is at the opposite extreme of its movement, it is in low-speed position, and when it is about midway between these two extremes, it is in neutral position.

My invention has for its object to provide a device adapted to be conveniently applied to a motor vehicle, and including a stop adapted to be automatically located in the path of the clutch lever when the latter is in its high speed position, to accurately arrest the lever in its neutral position, to be conveniently displaced by the operator to permit the lever to be moved beyond its neutral position, and to its low-speed position, and to be held out of and ready for action by the clutch lever when the latter is in its low speed position.

The invention is embodied in the improvements which I will now proceed to describe and claim.

Of the accompanying drawings, forming a part of this specification,—

Figure 1 is a view looking downward on portions of the floor and inclined footboard of a Ford automobile body, and showing the clutch lever in its high-speed position, and an automatic stop device embodying my invention, in position to arrest the clutch lever in its neutral position, the pedal portion of the clutch lever being removed and the lever being shown in section on the line $x$—$x$ of Fig. 2.

Fig. 2 is a side view of the upper portion of the clutch lever, showing an end view of the footboard and of the portion of the floor represented by Fig. 1, and an edge view of the stop device.

Fig. 3 is a section on line 3—3 of Fig. 2, looking toward the left.

The same reference characters indicate the same parts in all of the figures.

In the drawings, 12 represents the footboard or inclined floor portion of an automobile body located in advance of the horizontal floor portion 13, and having a slot 14 in which the clutch lever 15 is oscillatable. Other slots 16ª and 17ª are shown by Fig. 1, these slots receiving the reverse and brake levers (not shown).

The clutch lever normally occupies the high-speed position shown by full lines in Fig. 1, and is movable to the left hand position shown by dotted lines, this being the low-speed position. The neutral position is that shown by dotted lines between the high-speed and the low-speed position, the clutch lever being movable by pressure of the operator's foot from the high-speed position to either of the other positions, and automatically returned to the high-speed position when released.

In carrying out my invention, I pivotally connect with the footboard, a stop arm 16 which is normally held by a spring in the path of the clutch lever, and in position to arrest said lever in the neutral position, and is displaceable from its normal position by the operator to permit movement of the lever from the neutral to the low-speed position. Said stop arm is adapted to oscillate on a fixed fulcrum stud 17, and is provided with a shoulder 18. The spring 19, which normally holds the shoulder 18 in the path of the clutch lever, is here shown as engaged with a pedal arm 20 fixed to the arm 16 and preferably integral therewith, although it is obvious that the spring may be otherwise arranged to perform the described function. The shoulder 18 faces the clutch lever when the latter is in its high speed position, and is automatically held by the spring in the path in which the clutch lever moves from its high speed position to its neutral and low speed positions.

The arm 20 stands at an angle with the arm 16, the two arms constituting a bell-crank lever. The pedal arm 20 is arranged to be conveniently pressed by the operator's foot from the full line to the dotted line position shown by Fig. 1, the shoulder 18 being thus removed from the path of the clutch lever.

The arm 16 is extended from the shoulder 18 to provide an elongated bearing edge or face 22, which contacts with the clutch lever when the latter is in the low-speed position, the clutch lever thus holding the stop member displaced. When the clutch lever, in returning to its high speed position, passes its neutral position, the spring forces the shoulder 18 into the path of the clutch lever.

The edge face 22, coöperates with the clutch lever, when the latter is in its low speed position, in holding the stop shoulder out of the path of the clutch lever, and the spring 19 in readiness to automatically return the stop shoulder to said path, when the clutch lever moves from its low speed position far enough toward its high speed position.

The stop member 16, its arm 20, and the fulcrum stud 17, are supported by a base plate 24, which is formed to be seated on the upper surface of the footboard, and is attached as by screws 25 to the footboard, and presents suitable bearing surfaces with which portions of the arms 16 and 20 are in sliding contact. The stud 17 is preferably screwed into a tapped socket in the base plate. One end of the spring 19 is here shown as attached to a stud 26 fixed to the base plate. An ear 27 formed on the base plate constitutes a stop which limits the movement of the arm 20 by the operator's foot.

It will now be seen that a self-contained attachment is provided which may be screwed to the footboard 12 by an unskilled workman, without change in or adaptation of the footboard, other than the formation of holes therein for the attaching screws 25. The operator is enabled to accurately locate the attachment by adjusting the clutch lever to its neutral position, then placing the base in position on the footboard, with the stop shoulder 18 against one edge of the clutch lever, and then inserting the screws, these simple operations being performed from above the footboard and without the removal of anything. The entire attachment includes only four parts or members, viz., the base plate, the bell-crank lever, the fulcrum stud, and the spring, these parts being assembled before the attachment is applied to the footboard.

I claim:

The herein-described self-contained motor vehicle attachment comprising a base plate formed to be seated on the upper surface of a footboard adjacent to the clutch lever which projects through said footboard, the base plate being adapted for attachment to the footboard, a bell-crank-lever having a stop arm and a pedal arm, said stop arm being provided with a stop shoulder and with a longitudinal edge face extending from the said shoulder to the outer end of the arm, and a spring engaged with the base plate and bell-crank lever, and normally holding said shoulder in the path of the clutch lever, the stop shoulder being arranged to automatically arrest the clutch lever in its neutral position, and the said edge face being arranged to coöperate with the clutch lever, when the latter is in its low speed position, in holding the stop shoulder out of the path of the clutch lever and the spring in readiness to automatically return the stop shoulder to said path when the clutch lever moves toward its high speed position.

In testimony whereof I have affixed my signature.

STEWART G. WARNER.